United States Patent
Maier et al.

(10) Patent No.: US 8,757,394 B2
(45) Date of Patent: Jun. 24, 2014

(54) FILTER ELEMENT, FILTER DEVICE AND METHOD FOR PRODUCING A FILTER ELEMENT

(75) Inventors: Michael Maier, Reisbach (DE); Martina Bachfischer, Riedlhuette (DE)

(73) Assignee: Mann +Hummel GmbH, Ludwigsburg (DE)

(*) Notice: Subject to any disclaimer, the term of this patent is extended or adjusted under 35 U.S.C. 154(b) by 0 days.

(21) Appl. No.: 13/452,455

(22) Filed: Apr. 20, 2012

(65) Prior Publication Data

US 2012/0248026 A1    Oct. 4, 2012

Related U.S. Application Data

(63) Continuation of application No. PCT/EP2010/064977, filed on Oct. 7, 2010.

(30) Foreign Application Priority Data

Oct. 21, 2009    (DE) .......................... 10 2009 050 257

(51) Int. Cl.
     *B01D 29/31*      (2006.01)
     *B01D 39/08*      (2006.01)
     *B01D 29/07*      (2006.01)
     *B01D 27/06*      (2006.01)

(52) U.S. Cl.
     USPC ..................... 210/493.1; 210/483; 210/493.5; 210/506; 55/497; 55/521

(58) Field of Classification Search
None
See application file for complete search history.

(56) References Cited

U.S. PATENT DOCUMENTS

| | | | |
|---|---|---|---|
| 3,127,341 A | | 3/1964 | Abeles |
| 4,184,966 A | * | 1/1980 | Pall ............................ 210/493.2 |
| 4,235,609 A | * | 11/1980 | Garigioli ......................... 96/257 |
| 4,588,464 A | | 5/1986 | Miyagi |
| 5,114,508 A | | 5/1992 | Miyagi |
| 5,762,792 A | * | 6/1998 | Yamazaki .................. 210/323.2 |
| 5,873,920 A | * | 2/1999 | Wong et al. .................... 55/498 |
| 6,949,155 B1 | | 9/2005 | Lang et al. |
| 7,018,493 B2 | * | 3/2006 | Altmeyer et al. ............ 156/73.1 |

FOREIGN PATENT DOCUMENTS

| | | |
|---|---|---|
| DE | 19933163 A1 | 2/2001 |
| WO | WO03009922 A1 | 2/2003 |

OTHER PUBLICATIONS

PCT search report of priority application PCT/EP2010/064977.

* cited by examiner

*Primary Examiner* — Benjamin Kurtz
(74) *Attorney, Agent, or Firm* — James Hassselbeck

(57) ABSTRACT

A filter element (1) has first and second end sections (3A, 3B) of a flat filter medium which are secured to one another. A sheathing (4) is provided, wherein said sheathing is compressed by the end sections (3A, 3B) and surrounds the end edges (9) of the end sections (3A, 3B). Alternatively, the filter element (1) has first and second end sections (3A, 3B) of a flat filter medium, wherein the first end section (3A) has a fold (5) having two fold legs (6A, 6B). The end section (3B) of the second end section (2B) is then compressed between the fold legs (6A, 6B).

5 Claims, 2 Drawing Sheets

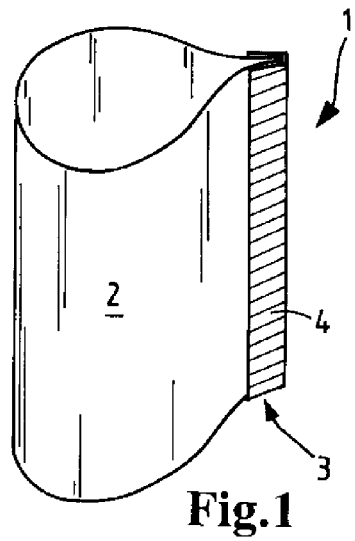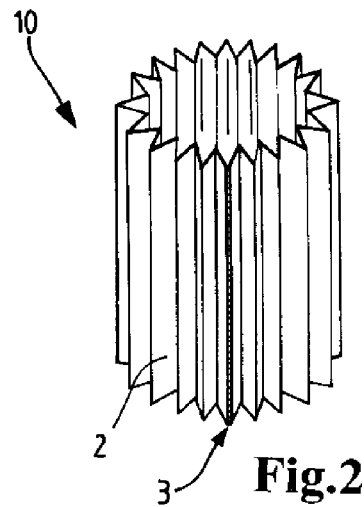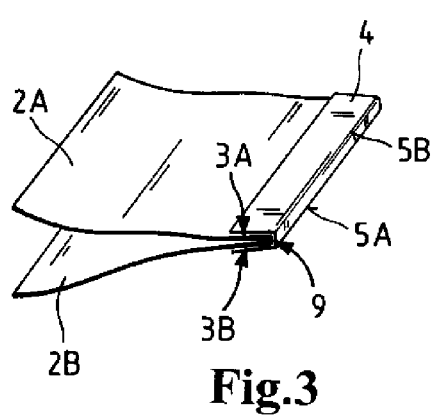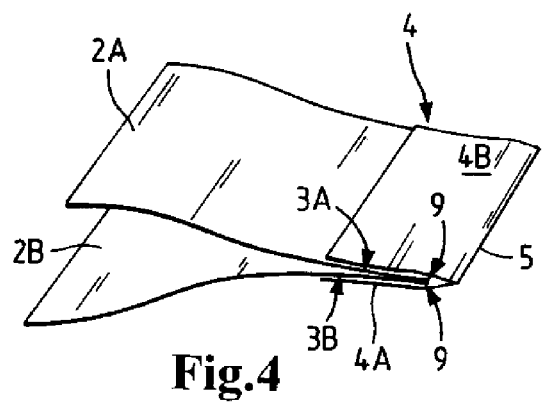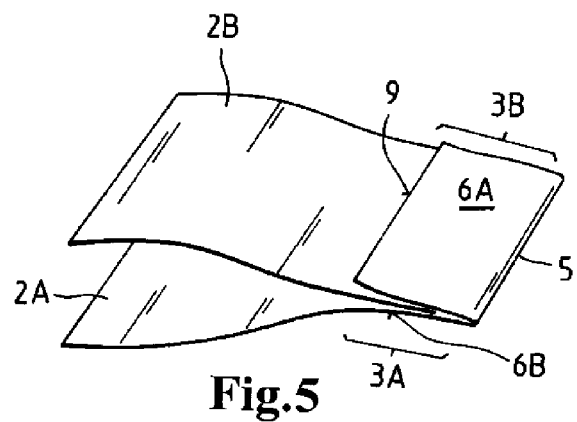

FILTER ELEMENT, FILTER DEVICE AND METHOD FOR PRODUCING A FILTER ELEMENT

CROSS REFERENCE TO RELATED APPLICATIONS

This application is bypass Continuation of international patent application no. PCT/EP2010/064977, filed Oct. 7, 2010 designating the United States of America, the entire disclosure of which is incorporated herein by reference. Priority is claimed based on German patent application no. 10 2009 050 257.2, filed Oct. 21, 2009.

TECHNICAL FIELD

This disclosure concerns a filter element, in particular with multi-layer filter media such as nonwoven filter materials. Moreover, a filter device and a method for connecting flat media are described.

BACKGROUND OF THE INVENTION

In order to filter, for example, in the automotive field, fluids such as fuels, operating media or passenger compartment air, folded or pleated nonwoven filter materials are frequently used. In this connection, it is often required to connect various edges or end sections of these flat filter materials with each other. Known filter elements are manufactured, for example, from initially zigzag-folded filter material sheets that are shaped to a tubular body. In order to close the tubular body, terminal fold sections must then be fluid-tightly connected to each other.

In the past, in this connection metal clips or clamps, for example, were used that hold together two flat sections resting on each other. It is also common to adhesively connect the two filter material sheets with each other or to connect them by fusing. In particular in case of multi-layer filter media, for example, several layers of thin nonwoven material that is impregnated or comprises special intermediate layers, it is difficult to prevent fraying of the edges that are resting on each other. A special difficulty resides in that the flat media to be connected must be connected fluid-tightly, i.e., the fluid to be filtered may not pass unfiltered at the connecting location through the filter material.

SUMMARY OF THE INVENTION

An object of the present invention is to provide an improved filter element, in particular with connected terminal fold sections of filter bellows media.

Accordingly, a filter element has a first and a second end section of a filter medium. The first and the second end sections are connected flat with each other wherein a sheathing that is compressed with the end sections encloses the terminal edges of the end sections.

As a filter medium, in particular nonwoven filter materials are conceivable. As a starting material generally sheets of an appropriate filter nonwoven are cut, folded, and subsequently end sections are connected to each other. This results then in an endless filter bellows that is processed further.

The end sections and the sheathing have preferably the same material. In this way, processing can be realized in a particularly beneficial way and the disposal of a used or soiled filter element requires no special measures.

By compression, for example, by plungers that are pressed against each other by employing ultrasound or high pressures and/or increased temperature, the materials of the filter medium and of the sheathing will join particularly well.

The sheathing can be, for example, in the form of a V-shaped or U-shaped profile wherein the end sections are then inserted into the space between the legs of the U or V and subsequent compression is carried out. In this way, the edges that may have the tendency to fray are completely enclosed by the sheathing.

For example, the sheathing is formed of a flat filter medium with at least one longitudinal fold. Between the first and second fold legs of the sheathing, the end sections are provided. The longitudinal folding is realized, for example, parallel to an edge of the corresponding sheathing strip.

Alternatively, a filter element has a first and a second end section of a flat filter medium. The first end section has a fold with two fold legs and the end section of the second end section is positioned between the fold legs and is compressed therewith.

A filter element has accordingly a flat filter material with at least two end sections wherein the two end sections are fixed on each other and no open terminal edges is existing since either the sheathing encloses both terminal edges or one of the end sections encloses the terminal edge of the other end section. In this connection, the end sections may originate from a single, for example, folded, filter material sheet or also several sheets or leaves of filter material may be connected to each other. The filter medium can have several layers wherein, for example, between the layers an absorbent material such as active carbon particles may be filled in. For example, filter media are used that between two layers have active carbon particles that absorb dirt or odor. In particular in case of multi-layer filter media, by means of sheathing or enclosure of the terminal edge of at least one of the end sections it is achieved that the layers will not fray or that introduced particles between the layers cannot flow out of the filter element.

The end section in the alternative embodiment can also have several folds with the same fold orientation. The section can form, for example, a U-shaped or V-shaped profile into which the edge of the second end section is inserted.

Usually, the filter element is formed of a filter medium that is folded multiple times in a zigzag shape. The zigzag folding increases the surface area of the filter element through which the fluid to be filtered flows, for example, air or fuel.

In order to improve the connection between the end sections, the end sections, the sheathing and/or the fold legs can be glued in addition. It is also conceivable that the end sections, the sheathing and/or the fold legs are compressed with each other with profiling. By embossment of a profile or a structure during compression, an improved connection for non-woven filter media results.

Finally, a filter device is proposed that has a corresponding filter element and embodies as operating medium filter, for example, a fuel filter or an air or passenger compartment filter for a motor vehicle.

In a method for producing a filter element it is provided: connecting a first end section of a flat filter medium with a second end section of a flat filter medium wherein the terminal edges of the end sections are enclosed by a sheathing. The sheathing is moreover compressed together with the end sections.

In a variant of the manufacturing process for a filter element it is provided: connecting a first with a second end section of a flat filter medium. In this connection, the first end section is provided with a fold with two fold legs and the second end section is compressed between the fold legs with the latter. Compression or connection of the end sections with the sheathing or the fold legs can be realized, for example, by ultrasound, fusing or laser welding.

Further possible implementations of the invention comprise also combinations that are not explicitly mentioned of features or embodied variants that are disclosed supra or in the following with respect to embodiments. In this connection, a person of skill in the art will also add individual aspects as improvements or supplements to the respective basic form of the invention.

Further embodiments of the invention are the subject matter of the dependent claims as well as of the embodiments of the invention disclosed in the following. In the following, the invention will be explained in more detail with the aid of embodiments with reference to the attached figures.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 1 is a schematic perspective illustration of a first embodiment of a filter element;

FIG. 2 is a schematic a perspective illustration of a second embodiment of a filter element;

FIGS. 3-5 are detailed illustrations of end sections of the filter medium connected to each other;

In the Figures, same, or functionally the same, elements inasmuch as nothing else is indicated, are identified with the same reference characters.

Figure 6:
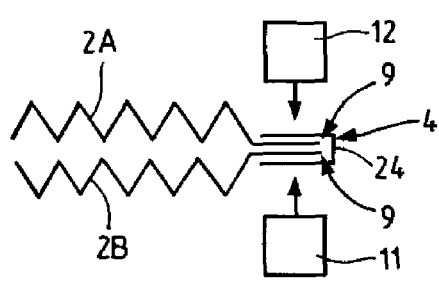
FIGS. 6, 7 are schematic illustrations for explaining variants of the manufacturing process for filter elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components and methods related to a filter element as well as means and methods of securing edges of filter media together. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a first embodiment of a filter element. In this connection, the filter element 1 is formed of a sheet of flat filter medium such as a nonwoven filter material. First, rectangular nonwoven filter material sheets are shaped such that end sections of the sheet 3 are resting on each other. In FIG. 1 an endless filter bellows 2 is formed thereby wherein the end sections 3 are secured by a sheathing 4. The filter element 1 can for example be inserted in a filter device in a filter cup such that the fluid to be filtered, for example, fuel, oil or also air, must pass through the filter medium and is purified thereby.

FIG. 2 shows a perspective illustration of a second embodiment wherein a filter element 10 is formed of a zigzag-folded nonwoven filter material. The zigzag-shaped filter material is formed to a bellows 2 in that end sections or terminal fold sections 3 are connected to each other. By the zigzag-shaped folding a larger surface area of the filter material in the filter element 10 results. The connection of the end sections 3 of the flat filter material is illustrated in the following Figures in more detail.

In FIG. 3, a detail of a filter element is shown that illustrates two connected end sections of the filter material sheet. A first filter material sheet 2A and a second filter material sheet 2B are illustrated. The end sections are identified by reference characters 3A and 3B. The end sections correspond thus to a predetermined strip of a rim or edge 9 of the respective filter material sheet 2A. 2B. Since in FIG. 3 and also in the following Figures only a detail of the area of the end sections 3A, 3B connected to each other is illustrated, the filter material sheets 2A and 2B may originate also from a single filter material sheet as, for example, illustrated in FIG. 1 or 2.

The two end sections 3A, 3B that are resting flat on each other are enclosed by a sheathing 4. The sheathing 4 is formed, for example, also of the same filter material and has in the embodiment of FIG. 3 a U-shaped profile. The U-shaped profile results from the dual folding 5A, 5B of a strip of filter material. Between the fold legs the end sections 3A and 3B are inserted and compressed with each other. The compression can be realized by high-pressure action assisted by laser welding or ultrasonic action. In this way, the filter media at least partially will join and this leads to a fluid-tight connection with each other.

FIG. 4 shows an alternative embodiment with two filter material sheets 2A, 2B. Again, a sheathing 4 is provided which, in comparison to FIG. 3, has a V-shaped profile. The end sections 3A, 3B of the flat filter medium 2A, 2B are positioned between the two fold legs 4A, 4B that are formed by the longitudinal fold 5 of the sheathing. The two terminal edges 9 of the end sections 3A, 3B can press, for example, at the inner side against the fold edge 5 of the sheathing 4.

A further variant for the connection of two end sections of flat filter materials is illustrated in FIG. 5. A first filter material sheet 2A and a second filter material sheet 2B are illustrated. As already indicated, they can also be oppositely positioned end sections of a single filter material sheet. The end section 3A of the first filter material sheet 2A, at the bottom in FIG. 5, is provided with a fold 5. The end section 3A can also be understood as being provided with a V-shaped profile. In this way, by the fold 5, parallel to the terminal edge 9 of the end section 3A, two fold legs 6A and 6B are produced. Between the fold legs 6A and 6B the end section 3B of the second filter material sheet 2B is inserted.

The three layers, i.e., the upper first fold leg 6A, the end section 3B of the second filter material sheet 2B, and the lower fold leg 6B of the first end section 3A are compressed with each other or joined.

In all of the examples illustrated in FIGS. 3-5 there is no open terminal edge of the filter material. In this way, a particularly reliable fluid-tight sealing action results, in particular, when the filter material sheets are of a multi-layer configuration.

In FIG. 6, a manufacturing process for corresponding filter elements in which end sections are connected to each other is schematically explained. In FIG. 6, two zigzag-folded filter media 2A, 2B are illustrated. A terminal fold section is placed between the legs of a U-shaped sheathing 4. For example, the terminal edges 9 abut the central leg 24 of the sheathing 4. However, a spacing between the terminal edges 9 and the facing side of the central leg 24 of the sheathing 4 may exist.

Finally, the layers of the sheathing are compressed with the terminal (fold) sections. For this purpose, for example a sonotrode 12 and an anvil 11 are pressed together. The sonotrode generates ultrasound that is matched, for example, to the material to be connected in order to achieve a particularly reliable connection of the material layers with each other.

Figure 7:
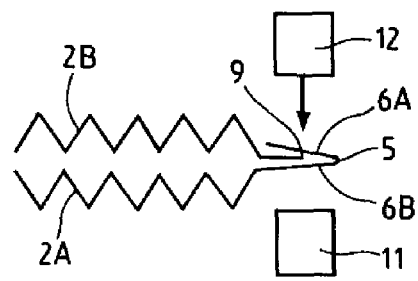

In FIG. 7, a manufacturing process for producing a connection as illustrated in FIG. 5 is illustrated. Two zigzag-folded filter materials 2A, 2B are illustrated again. An end section of the first filter material sheet 2A is provided with a fold 5 and comprises thus two fold legs 6A and 6B as well as a fold edge 5. The terminal edge 9 of the second end section of the second filter material sheet 2B is inserted between the fold legs 6A and 6B. Subsequently, compression of the layers with each other is carried out, for example, by using an anvil 11 and a sonotrode 12. In this connection, both elements (anvil and sonotrode) can be pressed against each other or only one of them, for example, only the sonotrode is designed to be movable.

Figure 8:
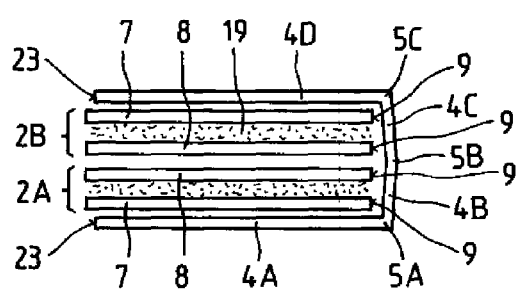
FIG. 8 is a schematic section illustration of an alternative embodiment of end sections of the filter medium connected to each other.

FIG. 8 shows a section illustration of an alternative embodiment for end sections connected to each other of a filter medium. In this connection, multi-layer filter media are illustrated. FIG. 8 shows only the end sections connected to each other in cross-section.

In this context, the filter media 2A, 2B each have two layers 7, 8 of a nonwoven filter material. Between the layers 7, 8, for example, active carbon particles 19 are strewn that serve as an absorber. The sheathing is formed of a simple strip of nonwoven material but can also be a plastic profile that is provided with three parallel folds 5A, 5B, and 5C with the same orientation. The sheathing comprises therefore fold legs or fold sections 4A, 4B, 4C, and 4D that are each defined by the folds 5A, 5B, 5C and the edges 23.

FIG. 8 shows that the terminal edge 9 of the filter medium 2A, 2B is enclosed by the sheathing. This means in particular that the active carbon particles 19 cannot fall out.

Figure 9:
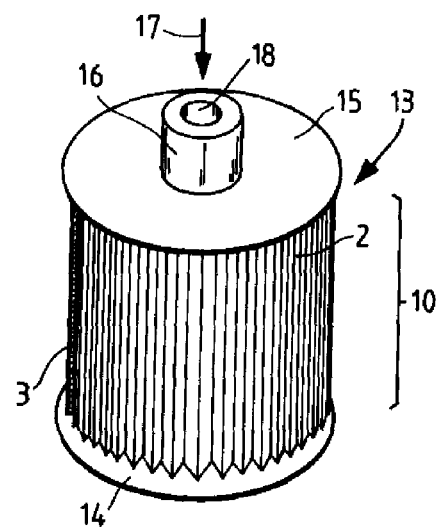
FIG. 9 is a schematic illustration of an embodiment of a filter device.

FIG. 9 shows a filter device, for example, as a fuel filter, that is embodied with an afore described filter element 10. The filter device or the fuel filter 13 compromises a folded bellows 2 that is formed of zigzag-folded filter material and is secured between two covers 14, 15. The folded bellows 2 corresponds to a filter element 10 in which two end sections 3 are joined by compression with each other. In this connection, in particular the connecting possibilities as illustrated in FIG. 3-5 or 8 can be used.

The upper cover 15 is provided with a connector 16 that has an opening 18. The fluid to be filtered can enter for example in the direction of arrow 17 into the interior of the folded bellows 2 and can flow out by passing through the folds of the filter material. Of course, further filter devices are conceivable. For example, the filter element can be inserted into a filter cup or an angular bellows can be formed.

Figure 10A:
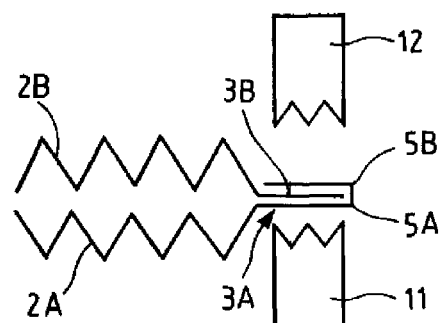
FIGS. 10A and 10B are schematic illustrations for explaining a further variant of the manufacturing process for filter elements.

Finally, FIG. 10 shows a further variant of a connection of two filter material end sections or method steps for producing the same. FIG. 10A shows similar to FIGS. 6 and 7 zigzag-folded filter materials 2A, 2B. The end section 3A of the first filter material is folded twice in the same orientation, as indicated by the reference characters 5A and 5B and encloses the end section 3B of the second filter material sheet 2B.

Sonotrode 12 and anvil 11 are provided with a profiling, for example, knurling. This means that upon compression of the end sections 3A, 3B, for example, a slightly zigzag-shaped or irregular profile is embossed into the material layers.

Figure 10B:
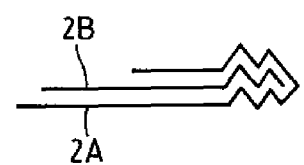

In FIG. 10B the result of the two end sections or filter sheets 2A, 2B compressed with each other is illustrated. Because of the multiple folding or embossment a particularly fast and reliable fluid-tight joining or connection of the two end sections 3A, 3B is provided.

The proposed measures for connecting the end sections or the manufacturing processes of filter elements and filter devices leads to a particular seal-tightness of these bellows seam connection or the connection of the end sections. Moreover, an improved visual appearance results because no further auxiliary means such as clamps or adhesives must be used. Moreover, no additional material is required for the manufacture so that the processing can be realized in a particularly cost-efficient way. Because of the use of nonwoven filter material as a sheathing, as it is used for example in the filter material sheets, the disposal of corresponding filter elements is possible also in a particularly simple and inexpensive way. As filter materials in particular thermoplastic nonwoven materials are used that can be easily deformed and compressed.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter element comprising:
   a flat filter medium sheet of a non-woven filter material having
      a first end section at a first edge of said sheet and having a terminal edge;
      a second end section at an opposing second end of said sheet and having a terminal edge;
      wherein said second end section overlays upon said first end section;
   a sheathing arranged on said end sections and enclosing over said terminal edges, said sheathing compressing said end sections together;
   wherein said end sections and said sheathing are made of the same non-woven filter material;
   wherein said sheathing is a flexible porous nonwoven filter material suitable for ultrasonic welding or laser welding;
   wherein said sheathing material is any of: a meltable material or a material with a meltable coating;
   wherein said sheathing is secured onto said end sections and terminal edges;
   wherein said sheathing and said end sections are secured together by ultrasonic welding or laser welding;
   wherein said sheathing includes
      a first fold leg; and
      and second fold leg;
   wherein said end sections are positioned between and compressed together by said two fold legs;
   wherein said fold legs and end sections are securely fastened together;
   wherein said flat filter medium sheet includes a plurality spaced folds forming a zigzag folded filter medium;
   wherein said end sections and said sheathing fold legs are moreover connected by gluing.

2. The filter element according to claim 1, wherein said sheathing has a V-shaped or U-shaped profile.

3. The filter element according to claim 1, wherein said flat filter medium comprises a plurality of overlaid layers.

4. A filter device comprising:
   a filter element according to claim 1;
   a first and a second end cover secured to opposing edges of said filter medium, said zigzag folded medium forming a circumferentially closed filter bellows.

5. The filter device according to claim 4, wherein said filter device is an operating medium filter, a fuel filter, an air filter, or a passenger compartment filter for a motor vehicle.

* * * * *